3,030,235
Patented Apr. 17, 1962

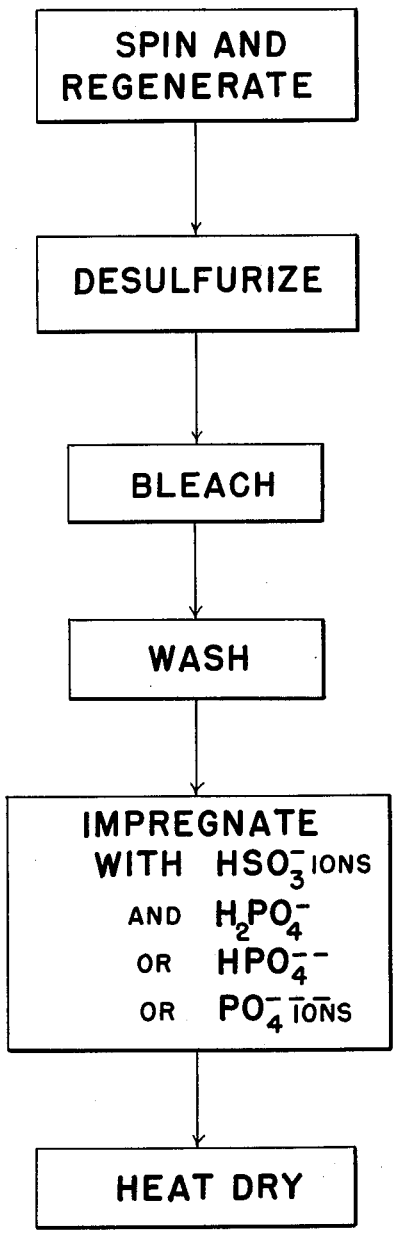

3,030,235
DISCOLORATION-RESISTANT REGENERATED
CELLULOSE ARTICLES
Alexander J. Goudie, Nixon, and Gerald J. Liloia, New Brunswick, N.J., assignors, by mesne assignments, to American Viscose Corporation, Marcus Hook, Pa., a corporation of Delaware
Filed Mar. 13, 1958, Ser. No. 721,151
7 Claims. (Cl. 117—144)

This invention relates to regenerated cellulose articles and their manufacture, and more particularly to regenerated cellulose fibers and their manufacture from cellulose, which articles do not become yellow when subjected to higher temperatures in the presence of moisture.

While this invention will be described with reference to fibers which include continuous filaments as well as staple fibers, it is to be understood that it is equally applicable to films, ribbons, bands, casings, and the like, and the term "article" as used above and hereinafter is intended to be inclusive.

It has long been noted that bleached regenerated cellulose articles derived from viscose lose some whiteness in being dried in accordance with the conventional drying practice in which such products are subjected to air drying at elevated temperatures and rather high humidity. Such discoloration is characterized by a tendency of the white rayon product to acquire a yellow tinted appearance; this tendency is particularly noticeable and undesirable when the rayon material is subjected to a succeeding drying or heating treatment occurring perhaps during the use of the material. For example, rayon goods used in fabricating surgical articles are subjected to steam sterilization before use. White wearing apparel, such as certain types of undergarments now manufactured, are woven from white yarn and are subject to heat and moisture during laundering. Under ordinary conditions of manufacturing rayon, such articles may be acceptably white upon delivery to the user but are noticeably discolored if they are subjected to temperature and humidity such as encountered in a steam sterilization treatment or laundering. The same is true to a certain extent, of pastel colored articles.

It has been proposed to treat regenerated cellulose products with hydrogen sulfite ions to render it resistant to discoloration.

Even with this treatment, in certain instances under some conditions, discoloration of the regenerated cellulose product may occur.

A primary object of the present invention is to provide white regenerated cellulose articles having improved resistance to discoloration. It is a specific object to render bleached undyed viscose rayon fiber and filaments with improved resistance to the discoloration normally resulting from a humid and hot atmosphere such as developed in drying and sterilization treatments. A further object is to provide an inexpensive treatment for regenerated cellulose articles by which the foregoing objects may be accomplished.

Other objects and advantages of the invention will be apparent from the following specification and the accompanying drawing.

In the drawing is shown a flow sheet of a process embodying the invention.

In accordance with the present invention, it has been found that discoloration as a result of exposure of regenerated cellulose articles to a heated humid atmosphere may be more completely prevented by drying the articles from an aqueous wet condition in the presence of $HSO_3$ ions and either $H_2PO_4$, $HPO_4$ or $PO_4$ ions. This solution may be applied conveniently within normal operations for manufacturing viscose filament or staple as a separate liquid treatment or by including in the finally applied finish solution chemicals suitable for supplying the hydrogen sufite and phosphate or hydrogen phosphate ions. For the ions to exist in such a solution and be effective for the purpose, it is necessary for the pH to be maintained in the range of 3 to 7. When it is desired to have a finish material carried on the finally dried fibers or filaments, such material may be included as an ingredient in the solution containing the hydrogen sulfite and hydrogen phosphate or phosphate ions. It is, of course, essential that the finish material be chemically stable within the aforementioned pH range.

The hydrogen sulfite ions may be supplied to the aqueous solution for treating the regenerated cellulose material by sulfurous acid; the sulfites; the anhydrous meta bisulfites (e.g. $Na_2S_2O_5$); or the acid sulfites (bisulfites) of the monovalent alkali metals, i.e., sodium, potassium, and lithium. A suitable solution of the anions may be obtained by bubbling $SO_2$ gas into a solution of a hydroxide of one of the monovalent alkali metals until the desired pH value is reached. It is necessary when using the acid or the non-acid sulfites to adjust the pH to a value within the range of 3 to 7. For example, when using the acid, sodium hydroxide may be added to a solution of the acid to adjust the pH; when using a non-acid sulfite, e.g., sodium sulfite, hydrochloric acid or some other non-oxidizing acid may be added. Such adjustment of pH tends to shift the acid or the sulfite toward the formation of a preponderance of the bisulfite which ionizes to provide acid sulfite anions. The hydrogen phosphate or phosphate ions may be supplied by phosphoric acid, sodium dihydrogen phosphate, trisodium phosphate or other suitable phosphoric acid salts.

The preferred material to add to a finish solution for regenerated cellulose fibers or filaments to provide the $HSO_3$ ions is the bisulfite itself since it provides in an approximate manner the desired pH value. Because of its low cost, sodium bisulfite is likely to be most generally used in practicing this invention. Although the discoloration inhibitor may be applied in solution to rayon material in a dried or partly dried condition, it is conveniently applied to bleached and rinsed wet yarn or fibrous product derived from the spinning operation and the immediate after treatments. When the filaments or fibers are treated in this condition it is found that optimum prevention of discoloration consistent with the economical use of the sodium bisulfite may be obtained by treating the rayon material with solutions of the bisulfite of about 0.4% concentration, although greater concentrations are entirely satisfactory from the standpoint of inhibiting discoloration. The strength of the solution required does not appear to be materially affected by the presence of a finish material therein as long as the pH of the solution is maintained within the above indicated operative range. The phosphoric acid added may be used to adjust the pH of the treating solution. When sodium dihydrogen phosphate or trisodium phosphate is used, amounts of the order of 0.05% by weight of the treating solution may be used. However, larger amounts may be used as long as the desired pH range is maintained.

In practicing the invention in manufacturing rayon staple fiber, the fiber is carried from the tow cutter as a blanket supported on a flat conveyor progressively through such conventional after treatments as desulfurizing, bleaching, deactivating residual bleach solution, and rinsing. In preparation for receiving the finish solution, the blanket advances some distance while water drains therefrom and then it passes through squeeze rolls. The blanket as it issues from the squeeze rolls has a moisture content in the range of 175 to 300 percent based on the dry weight of the fiber. Thereafter the blanket advances under a shower of a liquid finish solution containing hydrogen sulfite and hydrogen phosphate or phosphate ions. The blanket of fibers is then prepared for drying in a conventional convection dryer by squeezing, such as by passing the blanket through squeeze rolls to reduce the moisture content to as low a level as practical, e.g., around 200 percent based on the dry weight of the fiber. The fibers are thus derived from the rolls in a moist condition in which they are damp with the solution containing hydrogen sulfite and hydrogen phosphate or phosphate ions. Without other processing, the fibers are thereafter dried in a conventional manner, and while drying, the fibers may be conveniently retained in blanket form and supported on a conveyor.

The practice of the invention may in a similar manner be incorporated into the manufacturing of filaments. For example, in the manufacturing of tow or smaller strands by the known continuous systems, the step of cutting is omitted from the general steps mentioned hereinabove with respect to staple fiber. When filaments are collected in the form of cakes of yarn, as in pot spinning, the cakes are subjected, in a special machine well known to the trade, to the operations of deacidifying, desulfurizing, bleaching, rinsing, and applying the finish solution generally comprising an emulsion containing a textile lubricant. The cakes, just prior to the application of the sizing solution drain to about 250 percent moisture based on the dry weight of the cakes. Finishing solution containing preferably from 0.3 to 0.5 percent sodium bisulfite and 0.05% sodium dihydrogen phosphate, trisodium phosphate or phosphoric acid is then passed through the cakes which thereafter drain and subsequently are placed in a centrifugal extractor in which they are rotated to reduce the moisture content thereof to about 165 percent. Thereafter the cakes are dried in a conventional manner in the presence of the hydrogen sulfite and the hydrogen phosphate or phosphate ions such as by drying the cakes while supported on cars in a conventional type dryer for 30 to 125 hours at a temperature of 100 to 200° F.

Since, in practically all textile or industrial uses of rayon fibers, the fibers are preferably provided with a finish agent or surface conditioner for the fibers for one or more purposes, such as lubricating the fiber for passage through textile machinery, reducing the development of static electricity, or changing the inter-fiber cohesive forces, the discoloration inhibitor of this invention is preferably added with the finish agent for the reason that if separate solutions for each ingredient were used, the solution last applied would tend to wash out of the fibers the ingredient deposited in the fibers by the first applied solution. Thus, in order to supply the inhibitor and the finish material in proper quantity, the last solution to be applied to the fibers before drying contains both ingredients, if a finish material is required. It is, of course, essential that the finish material is one that will not be deleteriously affected by an acid environment in the pH range of 3 to 6. At present, finish materials are selected with respect to their stability within this pH range.

A number of fiber-finishing or surface-conditioning materials are found to be stable in solutions maintained at pH values within the range desired in the practice of this invention. These materials occur in sufficient variety to provide the essential functions required of finish materials, such as lubricity, preventing the development of static electricity, and the development of desired fiber to fiber cohesive forces. Examples of materials which are useful in one or more of these functions and are stable in the presence of hydrogen sulfite anions are 20 dendro sorbitan monolaurate, sorbitan monopalmitate and 16 dendro sorbitan tri-stearate which are non-ionic in character; anionic material, such as lauryl sulfate and white mineral oil in the presence of a sulfated butyl oleate; and cationic substances, such as cetylethylmorpholinium ethosulfate.

The following examples and comparisons are illustrative of the invention.

EXAMPLE I

A set of three 30 gram samples of viscose rayon which had been completely processed but never dried was selected. Each of these samples was treated with one liter of a solution containing 1,400 parts per million of sorbitan monolaurate and 5,000 parts per million of sodium bisulfite. Acetic acid was used to adjust the pH of one of the solutions to the desired amount. Two sets, each of three 30 gram samples of viscose rayon which had been completely processed but never dried were selected. Each sample was treated with one liter of a solution containing 1,400 parts per million of sorbitan monolaurate and 5,000 parts per million of sodium bisulfite. The pH of each of the solutions used to treat these samples was adjusted by means of phosphoric acid.

All samples were treated with the respective solutions for 15 minutes. They were squeezed to remove excess solution and dried for two (2) hours at 150° F. in a forced air oven. Portions of each of the samples were steam autoclaved (sterilized at 240° F. for 30 minutes). The degree of yellowness of sterilized and unsterilized fibers of each of the samples was measured on the Hunter Color and Color-Difference Meter. The data of these samples is as follows:

*Yellowness Values*

| pH | Acetic Acid Used to Adjust pH | |
|---|---|---|
| | Unsterilized | Sterilized |
| 3.02 | 2.8 | 7.8 |
| 4.00 | 3.1 | 6.5 |
| 4.93 | 3.3 | 6.4 |
| Avg | 3.1 | 6.9 |

*Set I.—Phosphoric Acid Used to Adjust pH*

| | | |
|---|---|---|
| 2.80 | 3.1 | 4.8 |
| 3.90 | 3.1 | 4.6 |
| 4.81 | 2.8 | 4.9 |
| Avg | 3.0 | 4.8 |

*Set II.—Phosphoric Acid Used to Adjust pH*

| | | |
|---|---|---|
| 3.03 | 2.9 | 4.6 |
| 3.98 | 2.7 | 5.0 |
| 5.01 | 2.6 | 4.8 |
| Avg | 2.7 | 4.8 |

Comparing the yellowness values of the samples treated with the acetic acid adjusted solution with those where phosphoric acid was used to adjust the pH, the degree of yellowness is lower for the fibers sterilized in the presence of the phosphoric acid which would yield the hydrogen phosphate or phosphate ions.

EXAMPLE II

Two sets of samples of regenerated cellulose staple fiber which had been completely processed but never dried were selected. The pH of the liquid on the samples was adjusted to near neutral. One of the sets of samples was treated with a solution comprising 1500 parts per million of sorbitan monolaurate that had been reacted with ethylene oxide and 5,000 parts per million of sodium meta bisulfite with a pH of 5.5. The other set of samples was treated with the same solution containing 500 parts per million of trisodium phosphate at a pH of 4.5. The samples were dried in a dryer and were sterilized at 240° F.

for 30 minutes. The samples had the following yellowness values when measured on a Color Master Meter:

*Yellowness Values*

5000 P.P.M. SODIUM META BISULFITE
NO PHOSPHATE IONS PRESENT

| Unsterilized: | Steam sterilized |
|---|---|
| 3.0 | 5.1 |
| 3.2 | 5.1 |
| 2.9 | 5.5 |
| 2.8 | 5.5 |
| 3.1 | 5.4 |
| 3.1 | 5.6 |
| 2.7 | 5.4 |
| 3.1 | 5.0 |
| 3.4 | 5.7 |

*Yellowness Values*

5000 P.P.M. SODIUM META BISULPHITE AND
500 P.P.M. TRISODIUM PHOSPHATE PRESENT

| Unsterilized: | Steam sterilized |
|---|---|
| 3.2 | 4.5 |
| 3.3 | 4.3 |
| 3.3 | 4.4 |
| 3.3 | 4.5 |
| 3.4 | 4.3 |

Measurements of the yellowness were made on fibers of the samples which had not been sterilized and were compared with the yellowness measurements made on the samples that were sterilized.

Comparting the yellowness values of the sterilized fibers that had been treated with the solution containing the trisodium phosphate with those treated with the solution from which the phosphate had been omitted, it is seen that where the phosphate ions were present the fibers had a lower yellowness value.

Various changes and modifications may be made in practicing the invention without departing from the spirit and scope thereof and, therefore, the invention is not to be limited except as defined in the appended claims.

We claim:

1. Process for manufacturing a discoloration-resistant cellulosic article comprising washing a preshaped regenerated cellulose article free of soluble impurities, saturating the article with a solution having a pH in the range of 3 to 6 and containing hydrogen sulfite ions and ions of the group consisting of hydrogen phosphate and phosphate ions and then drying the article in the presence of those ions.

2. Process for manufacturing a discoloration-resistant cellulosic article comprising washing a preshaped, bleached, regenerated cellulose article free of soluble impurities, while wet but substantially free of loosely held water, saturating the article with a solution having a pH in the range of 3 to 6 and having dissolved therein a compound from the group consisting of bisulfites of the monovalent alkali metals, sulfurous acid, and sulfur dioxide, and a compound from the group consisting of phosphoric acid, trisodium phosphate and sodium dihydrogen phosphate, squeezing most of the loosely held solution from the article, and then drying it in the presence of said compounds.

3. Process for manufacturing discoloration-resistant cellulosic pellicles comprising washing a preshaped, bleached, regenerated cellulose pellicle free of soluble impurities, while wet but substantially free of loosely held water, saturating the pellicle with a solution having a pH in the range of 3 to 6 and having dissolved therein a compound from the group consisting of bisulfites of the monovalent alkali metals, sulfurous acid, and sulfur dioxide, and a compound from the group consisting of phosphoric acid, trisodium phosphate and sodium dihydrogen phosphate, drying the pellicle from a condition of wetness caused by said solution and heat treating the pellicle with steam.

4. Process for manufacturing discoloration-resistant rayon fibers comprising washing fully regenerated fibers of viscose rayon free of soluble impurities, saturating the fibers with a solution having a pH in the range of 3 to 6 and having dissolved therein a compound from the group consisting of bisulfites of the monovalent alkali metals, sulfurous acid and sulfur dioxide, and a member of the group consisting of phosphoric acid, trisodium phosphate and sodium dihydrogen phosphate, then squeezing the solution from the fibers loosely held thereby, and drying the fibers.

5. Process as defined in claim 4 in which said solution contains an unctuous fiber finish ingredient that is chemically stable within said pH range.

6. Process for manufacturing discoloration-resistant rayon fibers comprising washing fully regenerated fibers of viscose rayon free of soluble impurities, saturating the fibers with a solution having a pH in the range of 3 to 6 and having dissolved therein sodium bisulfite of at least 0.1 percent concentration and a member of the group consisting of phosphoric acid, trisodium phosphate and sodium dihydrogen phosphate of at least 0.01 percent concentration and an unctuous fiber finish ingredient that is chemically stable within said range, then squeezing loosely held portions of the solution from the fibers, and drying the fibers.

7. As an article of manufacture, a shaped regenerated cellulosic article having a high resistance to discoloration when subjected to high temperatures and humidities and comprising the dried product of preshaped regenerated cellulose impregnated with an aqueous solution having a pH in the range of 3 to 6 and containing at least 0.1 percent of a substance selected from the group consisting of bisulfites of the monovalent alkali metals, sulfurous acid and sulfur dioxide, and 0.01 percent of a substance from the group consisting of phosphoric acid, trisodium phosphate and sodium dihydrogen phosphate.

References Cited in the file of this patent

UNITED STATES PATENTS

| 2,501,090 | Politzer | Mar. 21, 1950 |
| 2,648,593 | Stanton et al. | Aug. 11, 1953 |
| 2,705,689 | Hewson | Apr. 5, 1955 |
| 2,786,787 | Florio | Mar. 26, 1957 |
| 2,821,489 | McNeer et al. | Jan. 28, 1958 |